US005501804A

United States Patent [19]

Hall et al.

[11] Patent Number: 5,501,804

[45] Date of Patent: Mar. 26, 1996

[54] APPARATUS AND PROCESS FOR BLENDING ELASTOMER PARTICLES AND SOLUTION INTO A UNIFORM MIXTURE

[75] Inventors: Richard A. Hall; Michael G. O'Connell, both of Naperville; Evelyn A. Taylor, Edwardsville, all of Ill.

[73] Assignee: Amoco Corporation, Chicago, Ill.

[21] Appl. No.: 275,293

[22] Filed: Jul. 14, 1994

[51] Int. Cl.[6] ............................ B01D 17/12; B01D 36/00

[52] U.S. Cl. ................... 210/805; 210/510.1; 210/195.1; 210/500.25; 210/149; 210/489; 210/508; 425/197; 264/210.6; 264/211; 366/136; 366/339; 366/341

[58] Field of Search .............................. 210/500.1, 510.1, 210/500.25, 505, 506, 508, 500.29, 767, 149, 489, 805; 425/197, 199, 198; 264/176.1, 210.6, 211; 366/136, 159, 340, 341, 339; 526/909

[56] References Cited

U.S. PATENT DOCUMENTS

| | | | |
|---|---|---|---|
| 2,563,897 | 8/1951 | Wilson et al. | 210/510.1 |
| 3,276,597 | 10/1966 | Mesek et al. | 210/489 |
| 3,353,564 | 11/1967 | Bergeijk et al. | 138/41 |
| 3,573,158 | 3/1971 | Pall et al. | 210/505 |
| 4,344,859 | 8/1982 | Burke, Jr. | 366/136 |
| 4,364,761 | 12/1982 | Berg et al. | 210/510.1 |
| 4,500,706 | 2/1985 | Mathis et al. | 210/767 |
| 4,591,383 | 5/1986 | McGarry et al. | 210/510.1 |
| 4,814,081 | 3/1989 | Malinowski | 210/197 |
| 4,849,103 | 7/1989 | Schmidt et al. | 425/199 |
| 4,921,607 | 5/1990 | Langley | 210/510.1 |
| 5,141,631 | 8/1992 | Whitman | 425/199 |

*Primary Examiner*—Ana M. Fortuna
*Attorney, Agent, or Firm*—Wallace L. Oliver; Frederick S. Jerome

[57] ABSTRACT

In a mechanical cell for blending elastomer particles and solution into uniform mixtures, a solid core with an entrance surface, an exit surface spaced apart from and substantially parallel to the entrance surface, and a plurality of minute core passageways therebetween for flow of an elastomer-containing hydrocarbon solution from the entrance surface to the exit surface, the passageways have a characteristic dimension of predetermined size to reduce globules of elastomer to small particles distributed evenly in liquid hydrocarbon solution without plugging the passageways. Typically the passageways have a characteristic dimension of predetermined size to reduce globules of elastomer selected from the group consisting of natural rubber, styrene-butadiene rubber, polybutadiene rubber, polyisoprene, a nitrile rubber, and a copolymer of a 1,4-conjugated diene and a vinyl aromatic monomer, to small particles distributed evenly in liquid hydrocarbon solution comprising a vinyl aromatic monomer. Preferably the passageways have a characteristic dimension of predetermined size to reduce globules of elastomer to small particles having diameters in a range downward from about 200 micrometers.

14 Claims, 1 Drawing Sheet

APPARATUS AND PROCESS FOR BLENDING ELASTOMER PARTICLES AND SOLUTION INTO A UNIFORM MIXTURE

FIELD OF THE INVENTION

This invention relates to the field of mechanical systems which facilitate blending of elastomer gel and liquid phases. More specifically, this invention relates to mechanical cells for flow of elastomer-containing liquid which reduce globules of elastomer to small particles distributed evenly in the liquid, apparatus containing such cells and processes which use the cells to facilitate reduction of elastomer globules to small particles distributed evenly in liquid. The invention is especially concerned with apparatus and process for the preparation of useful polymer compositions by evenly dispersing gels of elastomer (small rubber-like particles) in liquid solutions of elastomer and monomer, which is subsequently polymerized in the presence of the elastomer thus forming, for example, rubber-modified vinyl aromatic polymer. Improved high impact polystyrene compositions polymerized from butadiene resin-containing styrene prepared according to this invention are easy to mold and/or extrude to smooth, glossy and uniform articles.

BACKGROUND OF THE INVENTION

Thermoplastic materials that possess a wide range of improved properties suitable for many diversified applications are obtained by polymerization of vinyl aromatic monomers in the presence of elastomeric materials. Commercial extrusion grade impact polystyrene toughened with polybutadiene rubber is used for an increasing number of applications requiring a tough, high quality, easily extruded, easily formed, and cost-competitive material.

Commercially important impact resistant polymers can be produced by polymerizing a major amount of vinyl aromatic compounds with a minor amount of rubber. Numerous different types of vinyl aromatic compounds and rubbers may be used, and are well known to those skilled in the art. In a polymerizing mixture, some of the vinyl aromatic compound polymerizes to form homopolymer, while the rubber may react with either such homopolymer or with monomer to form grafted copolymer. Impact resistant polymers appear to comprise a mixture of homopolymer and copolymer wherein the copolymer is distributed throughout the mass. Only a small amount of rubber is, generally, used. The amount of rubber used, typically, is about 10 percent by weight or less of the total polymers mass, but this is sufficient to impart impact strength to the total polymer mass.

With growth and sophistication of the impact resistant polymer industry has come increasing need for lower defects in most extrusion applications, particularly in thin film or coextrusion applications which are sensitive to appearance defects and defect-induced tears generated during extrusion and forming. It is well known that one major source of finished product defects is rubber gels or insoluble particles, such as crosslinked polybutadiene. While conditions during polymerization are closely controlled to minimize new gel formation, gels can be inherently present in the rubber and can harden during the polymerization process.

U.S. Pat. No. 4,230,835 to Richard C. Well describes a method of separating polybutadiene gels from styrene solutions by passing the solution through filter media of viscose rayon mat or felt on which gels collect. This method is reported to use viscose rayon mat or felt having a porosity of from about 15 to 50 micrometers. In testing, however, the patent states that it was decided to use a viscose felt with an opening size of less that 40 micrometers because about 40 micrometers is the smallest size particle visible to the naked eye.

It is an object of this invention to provide apparatus and processes which facilitate reduction of elastomer globules to small particles distributed evenly in liquid monomer and thus improving the quality of vinyl aromatic polymers produced therefrom by a mass thermal process.

SUMMARY OF THE INVENTION

In broad aspect, the invention is a mechanical cell for blending elastomer particles and solution into a uniform mixture. Cells according to the invention comprises a solid core having an entrance surface, an exit surface spaced apart from and substantially parallel to the entrance surface, and a plurality of minute core passageways therebetween for flow of an elastomer-containing hydrocarbon solution from the entrance surface to the exit surface, wherein the passageways have a characteristic dimension of predetermined size to reduce globules of elastomer to small particles distributed evenly in liquid hydrocarbon solution without plugging the passageways.

For any particular elastomer-solution and core system, sizes of a characteristic dimension of the passageways to obtain a desired reduction of elastomer globules are, generally, predetermined experimentally. Numerous elastomeric materials can be blended into uniform mixtures using cells of the invention. Preferably, globules of an elastomer selected from the group consisting of natural rubber, styrene-butadiene rubber, polybutadiene rubber, polyisoprene, a nitrile rubber, and a copolymer of a 1,4-conjugated diene and a vinyl aromatic monomer, is reduced to small particles distributed evenly in liquid hydrocarbon solution comprising a vinyl aromatic monomer. Passageways have a characteristic dimension of predetermined size to reduce globules of elastomer to small particles, preferably, having diameters in a range downward from about 200 micrometers.

In one aspect the invention is a mechanical apparatus for blending elastomer particles and solution into a uniform mixture comprising such mechanical cells which also have an entrance manifold means in flow communication with the plurality of core passageways at the entrance surface and an exit manifold means in flow communication with the same passageways at the exit surface, thereby in flow communication with the entrance manifold means, and a pump means having an inlet port and an outlet port, which outlet port is in flow communication with the entrance manifold means. Advantageously, mechanical apparatus according to this invention comprises a flow apportioning means having an inlet port in flow communication with the exit manifold means and at least a first and a second outlet ports, at least one of which outlet ports is in flow communication with the inlet port of the pump means.

In particularly useful embodiments of the invention, the passageways have a characteristic dimension of predetermined size to provide a pressure at the entrance surface in a range upward from about 5 psi, preferably in a range of from about 15 to about 250 psi at fluxes in a range of from about 5 $ft^3/ft^2$ hr to about 300 $ft^3/ft^2$ hr, preferably in a range of from about 10 $ft^3/ft^2$ hr to about 100 $ft^3/ft^2$ hr based on entrance surface area.

In another aspect the invention is a process for blending elastomer particles and solution into a uniform mixture, which comprises the steps of: (A) providing a mechanical apparatus which comprises, (i) a mechanical cell containing a solid core having an entrance surface, an exit surface spaced apart from and substantially parallel to the entrance surface, and a plurality of minute core passageways therebetween for flow of an elastomer-containing hydrocarbon solution from the entrance surface to the exit surface, wherein the passageways have a characteristic dimension of predetermined size to reduce globules of elastomer to small particles distributed evenly in liquid hydrocarbon solution without plugging the passageways, (ii) an entrance manifold means in flow communication with the plurality of core passageways at the entrance surface and an exit manifold means in flow communication with the same passageways at the exit surface, thereby in flow communication with the entrance manifold means, and (iii) a pump means having an inlet port and an outlet port, which outlet port is in flow communication with the entrance manifold means; (B) controlling temperatures within the mechanical apparatus, preferably to temperatures in a range from range 90° F. to about 180° F.; and (C) introducing an elastomer-containing liquid stream into the inlet port of the pump means, transferring elastomer-containing liquid from the outlet port of the pump means, preferably at a pressure in a range upward from about a pressure at the entrance surface in a range upward from about 5 psi, and expelling an elastomer-containing liquid stream.

Advantageously, processes according to this invention use flow apportioning means which have an inlet port in flow communication with the exit manifold means and at least a first and a second outlet ports, at least one of which outlet ports is in flow communication with the inlet port of the pump means, and include a process step of apportioning the elastomer-containing liquid stream with the flow apportioning means, transferring a first portion from an outlet port of the flow apportioning means to the inlet port of the pump means, and expelling a uniform elastomer-containing liquid product from another outlet port of the flow apportioning means. In preferred embodiments of this invention the apportioning is carried out to provide a recirculation factor, expressed as a ratio of the recirculating first portion to liquid product, is a number in a range from about 0.01 to about 10.

In other preferred embodiments of this invention, liquid product comprises a vinyl aromatic monomer containing up to 20 weight percent, preferably from about 2 to about 20 weight percent, of an elastomer selected from the group consisting of natural rubber, styrene-butadiene rubber, polybutadiene rubber, polyisoprene, a nitrile rubber, and a copolymer of a 1,4-conjugated diene. Advantageously, processes according to the invention include a step of polymerizing at least a portion of the liquid product to form an elastomer-modified vinyl aromatic polymer. Improved high impact polystyrene compositions can, advantageously, be polymerized from butadiene resin-containing styrene prepared according to this invention.

BRIEF DESCRIPTION OF THE DRAWING

The appended claims set forth those novel features which characterize the present invention. The present invention itself, as well as advantages thereof, may best be understood, however, by reference to the following brief description of preferred embodiments taken in conjunction with the annexed drawings, in which:

BRIEF DESCRIPTION OF THE INVENTION

Figure 1:
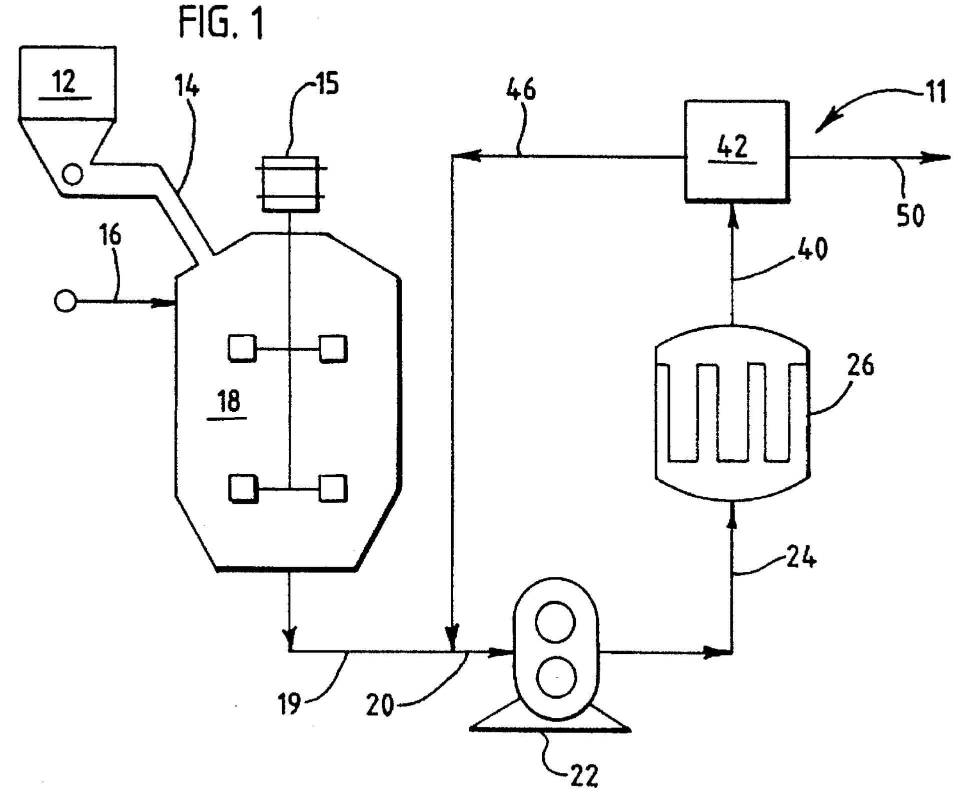
FIG. 1 is a simplified diagrammatic representation of a portion of an integrated apparatus for blending elastomer particles and solution into/uniform mixtures.

For manufacture of impact grades of polystyrene, for example, styrene solutions of up to about 10 weight percent of polybutadiene or styrene-butadiene are prepared in a dissolving vessel using a mechanical mixer and filtered during or prior to transfer to a polymerization reactor or system of multiple separate reactors. Prior to placement in a dissolver, solid bales of polybutadiene (about 75 pounds per bale) are cut, ground, or shredded into small pieces to allow dispersion and dissolution in styrene. The slurry of rubber pieces in styrene is, typically, heated to temperatures in a range from about 90° F. to about 110° F. to increase the rate of dissolution. After a few hours, i.e., about 1 to 3 hours or more, the resulting mixture is filtered to remove polybutadiene gels. While these gels swell in styrene, they are not soluble and if not removed will produce visible defects in extruded impact polystyrene sheet and like products.

This invention provides an apparatus and process by which a mixture of gels as large as 1000 micrometers in a liquid monomer is treated mechanically to reduce the gels to particles having smaller characteristic dimensions such that polymers produced therefrom give uniform finished products. Gels or globules of crosslinked rubber are, it is believed, broken up as a result of shearing, impingement of the passageway wall, and perhaps to some extent by the effects of cavitation and explosion after the mixture passes through the passageways. Generally, particles having smaller characteristic dimensions cause fewer significant defects due to rubber gels or insoluble particles, such as crosslinked polybutadiene.

Characteristic dimensions smaller than about 200 micrometer are desired for product free of visible defects in impact polystyrene sheet. For example, extrusion of impact polystyrene into 2-mil film is, typically, sensitive to the presence of gel greater than about 150 micrometer in diameter. Gels smaller than this threshold size are much less likely to cause a tear in the extruded film during fabrication.

Solid cores for use according to this invention can be made of any suitable porous material. Particularly useful are porous metals, such as bronze, stainless steel (type 316), nickel-base alloys (Monel, Inconel nickel), titanium, and aluminum. Porous metal products are made by compacting and sintering (heating), and other well known methods (See, for example, Kirk-Othmer *Encyclopedia of Chemical Technology,* third edition, Vol. 19, pages 28 to 61, John Wiley & Sons, Inc. 1982). Porous metal solid cores can be obtained from commercial sources such as Mott Metallurgical Corporation, 84 Spring Lane, Farmingtion Industrial Park, Farmington, Conn. 06032. In porous materials, the void space that determines the porosity is controlled as to amount, type, and degree of interconnection. When in contact with aromatic hydrocarbons over a long period of time at elevated temperature, these materials, advantageously, remain rigid and do not change porosity.

Porous material suitable for use according to this invention can also be made of selected fibers which are bonded together by polymeric resin. Such selected materials are, preferably, high-strength rigid structures which remain intact when in contact with aromatic hydrocarbons such as styrene and/or styrene-polybutadiene solutions.

Generally, useful fibrous materials include glass and quartz, ceramics, mineral wool, cotton, polyethylene, polypropylene, polyesters such as are make from terephthalic acid and ethylene glycol, polyamides, cellulose acetate and/or triacetate, and cellulose fibers. Typical bonding materials include thermosetting resins, such as polyepoxides, phenolic resins, and the like, and thermoplastic materials, such as polyethylene, polypropylene, polyisobutylene, polyamides, cellulose acetate, ethylcellulose, copolymers of vinyl chloride and vinyl acetate, polyvinyl chloride, polyvinylidene chloride, polyvinylidene fluoride, polytetrafluoroethylene, polytrifluorochloroethylene and others which remain intact when in contact with aromatic hydrocarbons over a long period of time at elevated temperature. Preferred bonded fiber cores include cellulose fibers bonded together by polymeric resin or resins, such as melamine resins which remain intact when in contact with aromatic hydrocarbons over a long period of time at elevated temperature. Bonded fiber cores are available under the trade names "Semler. Cellulose Melamine Resin-Bonded" from Selmer Industries, 3800 North Carnation Street, Franklin Park, Ill. 60131, or "Cuno Micro-Klean" and "Cuno Betapure" from Cuno, Inc., 400 Research Parkway, Meriden, Conn. 06450.

Generally, useful structures include layered types wherein several layers of different pore size are employed. See, for example U.S. Pat. No. 3,276,597 to Frederick K. Mesrk and E. V. Painter, U.S. Pat. No. 3,573,158 to David M. Paul and Cyril A. Keedwell, which are specifically incorporated herein in their entirety by reference.

Precise determination of particle size or characteristic dimension for gels, usually referred to as particle diameter, can actually be made only for spherical particles. For any other particle shape, such as rounded, angular, irregular, and even porous gels, a precise determination is practically impossible and such particle size or characteristic dimension represents an approximation only, base common usage by those skilled in the art.

Improved high impact polystyrene compositions are polymerized from butadiene resin-containing styrene feeds prepared according to .this invention. Techniques known in the art for polymerization of butadiene resin-containing styrene can be used to obtain improved polystyrene compositions. For example, polymerization processes of this invention can be practiced in a continuous or batch mass polymerization system, although a continuous system is typically used commercially. In a continuous process, monomer is polymerized as it proceeds through plug-flow, multiple-stage reactor system. One such continuous mass polymerization process in described in U.S. Pat. No. 3,945,976 to John L. McCurdy and Norman Stein, which patent is incorporated herein by reference. Typically, in a continuous process a monomer is introduced into a first stage where free radical polymerization begins either thermally or by use of a polymerization initiator. As polymerization continues, the polymerizing mass is pumped into one or more additional reactors; in which varying temperature-agitation levels are maintained. As the first polymerizing mass travels though the series of reactors; the temperature increases while the agitation rate decreases. A continuous process can be simulated by a batch reactor programmed to increase temperature and decrease agitation rate as a function of time.

In the production of rubber-modified vinyl aromatic polymer in a continuous, plug-flow, multiple-stage system, a solution of vinyl aromatic monomer and rubber are polymerized with agitation in multiple polymerization zones. After the polymerization begins, the system separates into two phases. Initially, the rubber in styrene is present in the larger amount and is the major or continuous phase. As .the reaction proceeds and more polystyrene is formed, a phase inversion occurs whereupon the polystyrene in styrene becomes the continuous phase. At the phase inversion point the system must be agitated sufficiently to disperse the polystyrene-grafted rubber phase into roughly spherical particles which act to reinforce an otherwise brittle polystyrene matrix. Typically, polymerization is continued to a level in the last reactor stage such that up to about 95 percent of monomer has been converted to polymer, although about 80 to 90 percent conversion is preferred. Typically, polymeric material removed from the last reactor stage is devolatilized to remove residual monomer. Sufficient agitation is maintained in the reactor stages preceeding the last reactor state to disperse rubber particles adequately within the polymerizing mass. The level of agitation required in a specific reactor system can be optimized readily by routine experimentation.

Rubbers which can be used in this invention include polybutadiene and styrene-butadiene rubbers. Typically useful polybutadiene rubbers are linear and branched polymers of butadiene containing from 25 to 99 percent cis content with less than 20 percent free vinyl unsaturation (i.e., 1,2-addition). A commonly used polybutadiene would contain about 35 percent cis and about 14 percent free vinyl unsaturation. Solution viscosities for useful polybutadiene rubbers range from 25 to 220 centipoise and preferably range from 70 to 190 centipoise measured at a concentration of 5 percent by weight in styrene at 30° C. Useful styrene-butadiene rubbers are random or block copolymers of butadiene and styrene, or combination thereof, with 5 to 50 percent bound styrene. Typical solution viscosities are 20 to 190 centipoise and typical. Mooney viscosities are 30 to 120. These rubbers can be present in styrene polymers at levels from about 2 to 20 percent and typically from about 3 to 10 percent.

Although a preferred polymerization system contains three reactor states, the number of stages can be varied as long as the sequence of temperature ranges and agitation substantially is maintained.

In addition to vinyl aromatic monomer and rubber, up to about 10 percent of other materials can be included in the polymerization feed stock, such as stabilizers, antioxidants, colorants, flame retardants, and lubricants.

Furthermore, an advantageous process for obtaining narrow molecular weight distribution of the resulting polymer by incorporating a cross-linking agent into a polymerizing mass at a point where about 60 to about 95 percent of monomer is converted to polymer is described in U.S. Pat. No. 4,308,360 to Richard A. Hall, which patent is incorporated herein by reference. The crosslinking agent is selected from the group consisting of divinylbenzene, acrylic anhydride, N-(iso-butoxymethyl) acrylamide, glycidyl methacrylate, p,p'-divinylbiphenyl, vinyl methacrylate, allyl methacrylate, diallyl maleate, diallyl itaconate, diallyl diglycolate, allyl cinnamate, divinylnaphthalene and monallyl meleate.

Another advantageous process for obtaining narrow molecular weight distribution of the resulting polymer by incorporating a polymerization inhibiting agent into a polymerizing mass at a point where about 60 to about 95 percent of monomer is converted to polymer is described in U.S. Pat. No. 4,713,521 to Richard A. Hall and Jeffery I. Rosenfeld, which patent is incorporated herein by reference. Preferably such an inhibiting agent is selected from the group consisting of hydrazobenzene, tetraphenyloctatraene, dinitrobenzene, aniline, p-tert-butyl catechol, hydroquinone, diphenylvinylbromide, tetranitromethane, and sulfur.

The following examples will serve to illustrate certain specific embodiments of the herein disclosed invention. These examples should not, however, be construed as limiting the scope of the novel invention, as there are many variations which may be made thereon without departing from the spirit of the disclosed invention, as those of skill in the art will recognize.

DETAILED DESCRIPTION

While this invention is susceptible of embodiment in many different forms, this specification and accompanying drawing disclose only some specific forms as an example of the use of the invention. In particular preferred embodiments of the invention for reducing globules of elastomer to smaller particles distributed evenly in a liquid hydrocarbon solution comprising a vinyl aromatic monomer are illustrated and described. The invention is not intended to be limited to the embodiments so described, and the scope of the invention will be pointed out in the appended claims.

The apparatus of this invention is used with certain conventional components the details of which, although not fully illustrated or described, will be apparent to those having skill in the art and an understanding of the necessary function of such components.

More specifically with reference to FIG. 1, the integrated apparatus 11 for blending elastomer particles and solution into uniform mixtures comprises: one or more mechanical cells, illustrated as cell canister 26 containing suitable solid cores with a plurality of minute core passageways having a characteristic dimension of predetermined size to reduce globules of elastomer to small particles; pump means having an inlet port and an outlet port, illustrated as pump 22; and flow apportioning means, illustrated as apportioning unit 42.

During operation of the integrated apparatus 11 a vinyl aromatic monomer is charged to dissolver vessel 18 via conduit 16 from a monomer storage unit (not shown). Bails of elastomer are shredded in grinder 12 and transferred directly into dissolver vessel via conveyor 14. Shredded elastomer is, typically, dispersed in the monomer by mixing with agitator 15. Elastomer-monomer solution containing elastomer particles or globules flows from dissolver vessel via conduit 19 to inlet port 20 of pump 22 and from its outlet port into cell canister 26 via conduit 24. Effluent from cell canister 26 flows to apportioning unit 42 via conduit 40. Apportioning unit 42 divides the elastomer-containing effluent into a first portion and product portion. The first portion flows from an outlet port of the apportioning unit 42 via transfer line 46 to inlet port 20 of pump 22. A product portion is transferred via conduit 50 to intermediate storage or polymerization units (not shown).

Figure 2:
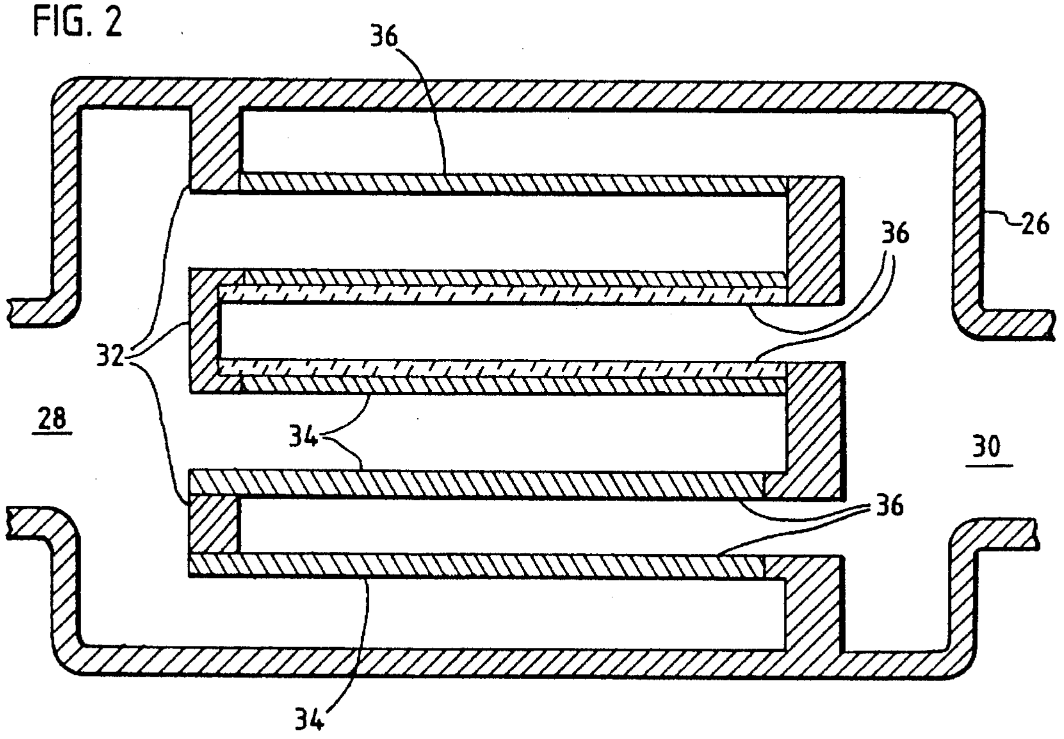
FIG. 2 is a an enlarged cross section of a canister containing an array of cells embodying core configurations of the present invention.

FIG. 2 illustrates an enlarged cross section of cell canister 26 containing an array of mechanical cells for integrated apparatus 11 of FIG. 1. Specifically, mechanical cells 32 are illustrated to extend in the plane of the viewing paper and comprise cell cores having an entrance surface 34, an exit surface 36 spaced apart from and substantially parallel to the entrance surface, and a plurality of minute core passageways (not shown) therebetween for flow of an elastomer-containing hydrocarbon solution from the entrance surface to the exit surface. The passageways have a characteristic dimension of predetermined size to reduce globules of elastomer to smaller particles distributed evenly in a liquid hydrocarbon solution comprising a vinyl aromatic monomer without plugging the passageways. Cell canister 26 has an entrance manifold 28 in flow communication with the plurality of core passageways at the entrance surfaces 34 and an exit manifold 30 in flow communication with the same passageways at exit surfaces 36, thereby in flow communication with the entrance manifold 28. For economy of illustration different embodiments of mechanical cells 32 and reactor cell cores are shown in FIG. 2.

EXAMPLES OF THE INVENTION

GENERAL

Gel Index

Styrene-butadiene solutions containing rubber gel were characterized for gel .content above a certain size by passing a standard or set amount of solution through a small screen with an opening size of 37 micrometers (400 mesh). Inspection of the dried screen using a microscope .revealed gels which did not pass through the screen blocking screen openings. The number of blocked screen openings provided an index by which gel size reduction was measured relative to feed solutions.

Test Apparatus

One or more porous cores were housed in each of two canisters connected in series. Thus feed passed sequentially into a first canister, through a first porous core, into a second canister, and through a second porous core. For some tests, the effluent stream from the second core, or cores, was split to allow recirculation to the inlet of the first canister.

EXAMPLE 1

For this Example a positive displacement pump was used to feed, in series, two cylindrical filters each having 2.5 inch outer diameter and 4 inch length (Cuno Betapure 20 micrometer filters, area 31.42 $in^2$). Elastomer-containing hydrocarbon solution used in each run was 5.3 percent polybutadiene rubber in styrene. Viscosity of this feed solution was 250 cp. Pressure drop through filter remained nearly constant during several hours of continuous filtration for each run. Reported gel reduction percentages were based on average gel index of two filtrate samples taken during continuous filtration and average gel index of feed solution. Results are shown in Table 1 below.

TABLE 1

Runs Using Two Cylindrical Filters in Series

| Run Number | Run 1 | Run 3 |
|---|---|---|
| Filter flux, $gpm/ft^2$ | 1.68 | 8.40 |
| Pressure drop | | |
| Filter 1, psi | 10 | 27 |
| Filter 2, psi | 9 | 34 |
| Gel reduction, %[1] | 40 | 66 |

[1]Average of two samples of filtrate

EXAMPLE 2

Apparatus used in Example 1 was adapted to separate filtrate from the second filter into a throughput fraction and a recirculation fraction. The recirculation fraction was directed to the suction of the pump. The ratio of recirculation flow to throughput is reported as a recirculation factor. Elastomer-containing hydrocarbon solution used in each run was 5.3 percent polybutadiene rubber in styrene. Viscosity of this feed solution was 250 cp. Pressure drop through filter remained nearly constant during several hours of continuous filtration for each run. Reported gel reduction percentages were based on average gel index of two filtrate samples taken during continuous filtration and average gel index of feed solution. Results are shown in Table 2 below.

TABLE 2

| Runs Using Two Cylindrical Filters in Series with Recirculation | | | |
|---|---|---|---|
| Run Number | Run 4 | Run 7 | Run 8 |
| Recirculation factor | 2.00 | 4.00 | 4.00 |
| Filter flux, gpm/ft$^2$ | 5.04 | 1.68 | 8.40 |
| Pressure drop | | | |
| Filter 1, psi | 20 | 19 | 26 |
| Filter 2 psi | 24 | 21 | 36 |
| Gel reduction[1], | 53 | 78 | 73 |

[1]Average of two samples of filtrate

EXAMPLE 3

For this Example a positive displacement pump was used to feed, in series, two canisters each containing, in parallel 12 cylindrical filters. Each cylindrical filter had a 2.5 inch outer diameter and 4 inch length (Selmer Cellulose Melamine Resin-Bonded (TM), area 157 in$^2$). Elastomer-containing hydrocarbon solution used in each run was 7.1 percent polybutadiene rubber in styrene. Viscosity of this feed solution was 700 cp. The recirculation factor was 2.0. Reported gel reduction percentages were based on average gel index of filtrate samples taken during continuous filtration and average gel index of feed solution. Results are shown in Table 3 below.

TABLE 3

| Runs Using Two Canisters in Series Containing Cylindrical Filters | | |
|---|---|---|
| Run Number | Run 9 | Run 10 |
| Filter flux, gpm/ft$^2$ | 5.04 | 5.04 |
| Pressure drop | | |
| Filter 1, psi | 70–92 | 70–92 |
| Filter 2, psi | 38–42 | 38–42 |
| Gel reduction, % | 63.4[1] | 92.9[2] |
| Gel reduction, % | 66.7[3] | 56.7[4] |

[1]Feed, Average of seven samples of filtrate.
[2]Feed, one sample of filtrate.
[3]Product extruded into 2-mil film, Average of four samples.
[4]Product extruded into 2-mil film, Average of three samples.

COMPARATIVE EXAMPLE A

For this Comparative Example a commercially available high shear in-line mixer was used with recirculation, in place of the filters. Elastomer-containing hydrocarbon solution used in this run was 5.3 percent polybutadiene rubber in styrene. Viscosity of this feed solution was 250 cp. Reported gel reduction percentages were based on average gel index of two filtrate samples taken during continuous filtration and the average gel index of the feed solution. During the period of elapsed run time from 2 hour to 8 hours the observed gel reduction was in a range of from 8 to 10.4 percent. In this run the high shear in-line mixer with recirculation added heat to the feed, resulting in a 15° F. temperature rise at 0.5 GPM.

That which is claimed is:

1. A mechanical apparatus for blending elastomer particles and solution into uniform mixtures, comprising;

a mechanical cell containing a solid core having an entrance surface, an exit surface spaced apart from and substantially parallel to the entrance surface, and a plurality of minute core passageways therebetween for flow of an elastomer-containing hydrocarbon solution from the entrance surface to the exit surface, wherein the passageways have a characteristic dimension of predetermined size to reduce globules of elastomer to small particles distributed evenly in a liquid hydrocarbon solution without plugging the passageways, the solid core comprising fibers which are bonded together by polymeric resin, the cell further comprising an entrance manifold means in flow communication with the plurality of core passageways at the entrance surface and an exit manifold means in flow communication with the same passageways at the exit surface, thereby in flow communication with the entrance manifold means;

a pump means having an inlet port and an outlet port, which outlet port is in flow communication with the entrance manifold means; and a flow apportioning means having an inlet port in flow communication with the exit manifold means and at least a first and a second outlet ports, at least one of which outlet ports is in flow communication with the inlet port of the pump means.

2. The process according to claim 1 wherein the passageways have a characteristic dimension of predetermined size to provide a pressure at the entrance surface in a range upward from about 5 psi at flux in a range of from about 5 ft$^3$/ft$^2$ hr to about 300 ft$^3$/ft$^2$ hr based on entrance surface area.

3. The mechanical apparatus according to claim 1 wherein the fibers comprise a cellulose.

4. The mechanical apparatus according to claim 3 wherein the fibers are bonded together by melamine resin.

5. The mechanical apparatus according to claim 1 wherein the passageways have a characteristic dimension of predetermined size to reduce globules of elastomer to small particles having diameters in a range downward from about 200 micrometers.

6. A process for blending elastomer particles and solution into uniform mixtures, which comprises the steps of (A) providing a mechanical apparatus which comprises;

a mechanical cell containing a solid core having an entrance surface, an exit surface spaced apart from and substantially parallel to the entrance surface, and a plurality of minute core passageways therebetween for flow of an elastomer-containing hydrocarbon solution from the entrance surface to the exit surface, wherein the passageways have a characteristic dimension of predetermined size to reduce globules of elastomer to small particles distributed evenly in liquid hydrocarbon solution without plugging the passageways, the cell further comprising an entrance manifold means in flow communication with the plurality of core passageways at the entrance surface and an exit manifold means in flow communication with the same passageways at the exit surface, thereby in flow communication with the entrance manifold means, a pump means having an inlet port and an outlet port, which outlet port is in flow communication with the entrance manifold means, and a flow apportioning means having an inlet port in flow communication with the exit manifold means and at least a first and a second outlet ports, at least one of which outlet ports is in flow communication with the inlet port of the pump means, (B) controlling temperatures within the mechanical apparatus to temperatures in a range from about 90° F. to about 180° F., (C) introducing an elastomer-containing liquid stream into the inlet port of the pump means, transferring elastomer-containing liquid from the outlet port of the pump means at a pressure in a range upward from about a pressure at the entrance surface in a range upward from about 5 psi, and expelling an elastomer-containing liquid stream, and (D) apportioning the elastomer-containing liquid stream into at least a first portion and product portion with the flow apportioning means, transferring the first portion from an outlet port of the flow apportioning means to the inlet port of the pump means, and expelling a uniform elastomer-containing liquid product portion from another outlet port of the flow apportioning means;

wherein a recirculation factor, expressed as a ratio of the first portion to the product portion, is a number in a range from about 0.01 to about 10.

7. The process according to claim 6 wherein the passageways have a characteristic dimension of predetermined size to provide a pressure at the entrance surface in a range upward from about 5 psi at flux in a range of from about 5 $ft^3/ft^2$ hr to about 300 $ft^3/ft^2$ hr based on entrance surface area.

8. The process according to claim 6 wherein the solid core comprises a porous material selected from the group consisting of metals, metal alloys, glasses, and ceramic materials.

9. The process according to claim 6 wherein the solid core comprises a porous material selected from the group consisting of bronze, stainless steel, nickel-base alloys, titanium, and aluminum.

10. The process according to claim 6 wherein the solid core comprises fibers which are bonded together by polymeric resin.

11. The process according to claim 6 wherein the fibers comprise cellulose fibers bonded together by melamine resin.

12. The process according to claim 6 wherein the passageways have a characteristic dimension of predetermined size to reduce globules of elastomer selected from the group consisting of natural rubber, styrene-butadiene rubber, polybutadiene rubber, polyisoprene, a nitrile rubber, and a copolymer of a 1,4-conjugated diene and a vinyl aromatic monomer, to small particles distributed evenly in liquid hydrocarbon solution comprising a vinyl aromatic monomer.

13. The mechanical apparatus according to claim 12 wherein the passageways have a characteristic dimension of predetermined size to reduce globules of elastomer to small particles having diameters in a range downward from about 200 micrometers.

14. The process according to claim 6 wherein the liquid product comprises a vinyl aromatic monomer containing from about 2 to about 20 weight percent of an elastomer selected from the group consisting of natural rubber, styrene-butadiene rubber, polybutadiene rubber, polyisoprene, a nitrile rubber, and a copolymer of a 1,4-conjugated diene, and the process further comprising step (E) polymerizing at least a portion of the liquid product to form an elastomer-modified vinyl aromatic polymer.

* * * * *

UNITED STATES PATENT AND TRADEMARK OFFICE
CERTIFICATE OF CORRECTION

PATENT NO.: 5,501,804

DATED: March 26, 1996

INVENTOR(S): Richard A. Hall, Michael G. O'Connell, Evelyn A. Taylor

It is certified that error appears in the above-identified patent and that said Letters Patent is hereby corrected as shown below:

| Col. | Line | |
|---|---|---|
| 1 | 63 | "U.S. Pat. No. 4,230,835 to Richard C. Well" should read --U.S. Pat. No. 4,230,835 to Richard C. Weil-- |
| 5 | 18 | "Selmer Industries," should read --Semler Industries,-- |
| 7 | 43-44 | "dissolver vessel via conduit 19" should read --dissolver vessel 18 via conduit 19-- |

Signed and Sealed this

Ninth Day of July, 1996

*Attest:*

BRUCE LEHMAN

*Attesting Officer*

*Commissioner of Patents and Trademarks*